Jan. 1, 1924. 1,479,709
M. J. GOLDSTEIN
BOLT AND CHAIN LOCK
Filed Dec. 28, 1921
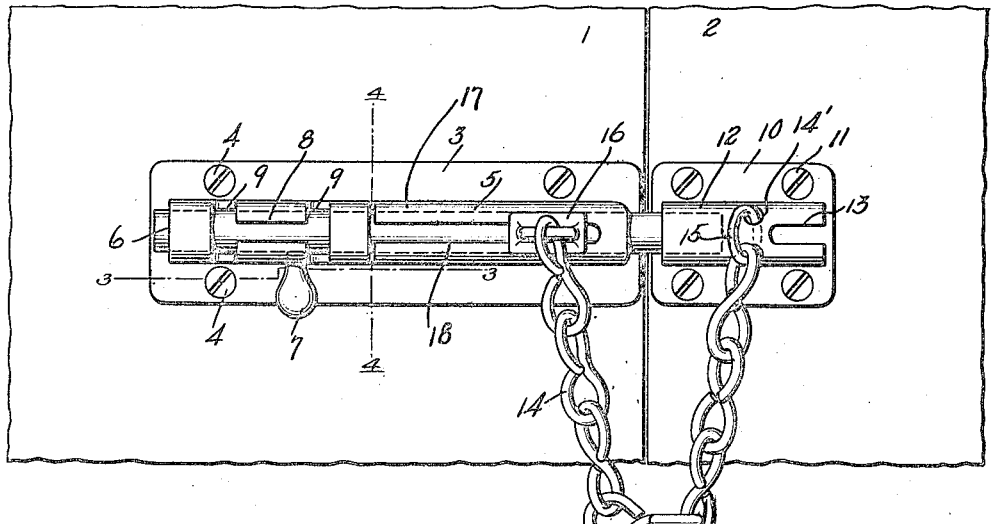
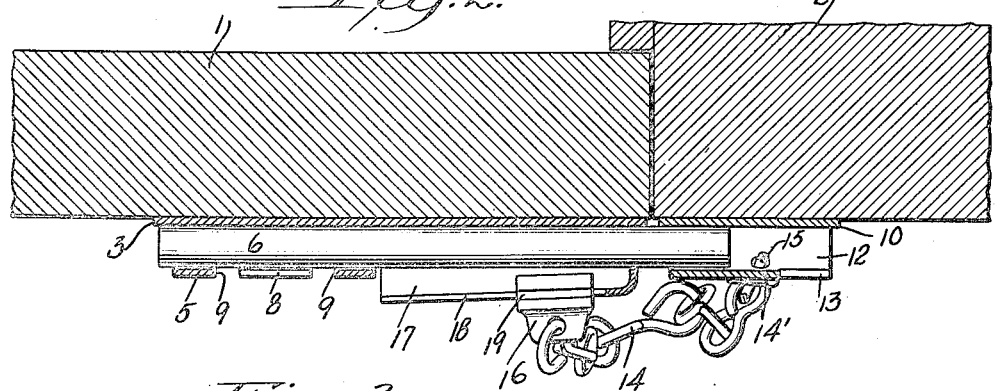
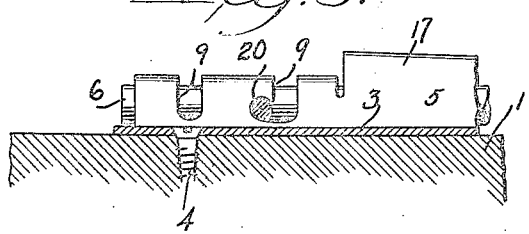
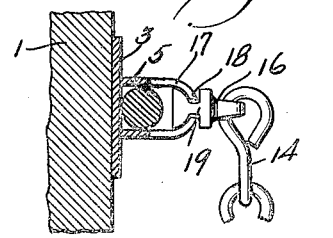
WITNESSES
INVENTOR
M.J. GOLDSTEIN
BY
ATTORNEYS Patented Jan. 1, 1924.

1,479,709

UNITED STATES PATENT OFFICE.

MEYER J. GOLDSTEIN, OF BROOKLYN, NEW YORK.

BOLT AND CHAIN LOCK.

Application filed December 28, 1921. Serial No. 525,376.

*To all whom it may concern:*

Be it known that I, MEYER J. GOLDSTEIN, a citizen of the United States, and a resident of the city of New York, borough of Brooklyn, in the county of Kings and State of New York, have invented a new and Improved Bolt and Chain Lock, of which the following is a full, clear, and exact description.

This invention relates to improvements in bolt and chain locks, an object of the invention being to provide a combined bolt and chain which may be used simultaneously or independently for locking a closure against opening.

A further object is to provide a novel means for preventing the unauthorized retraction of the bolt when the same is in locked position, and to provide means whereby the operation of both the bolt and the chain are entirely independent of each other.

A still further object is to provide a locking device of this character which will be simple and practical in construction, strong, durable and efficient in use, and comparatively inexpensive to manufacture.

With these and other objects in view, the invention consists in certain novel features of construction and combinations and arrangements of parts as will be more fully hereinafter described and pointed out in the claims.

In the accompanying drawings:

Figure 1 is a view in elevation showing my improved bolt and chain lock in applied and locked position;

Figure 2 is a view in longitudinal section through Figure 1;

Figure 3 is a sectional view on the line 3—3 of Figure 1; and

Figure 4 is a view in transverse section on the line 4—4 of Figure 1.

Referring in detail to the drawings, I have used the reference numeral 1 to indicate a closure and the numeral 2 to designate a closure frame. A sleeve plate 3 is secured to the closure adjacent the edge thereof by any suitable securing devices such as the screws 4. The plate 3 carries a bolt sleeve 5 wherein a round bolt 6 is slidable and rotatable. A handle 7 on the bolt is movable in a longitudinal slot 8 in the sleeve 5, the handle and slot cooperating to limit the longitudinal movement of the bolt. Laterally extending recesses 9 communicate with the ends of the slot 8 and are adapted to receive the handle 7 to hold the bolt against accidental longitudinal movement.

A keeper plate 10 is secured to the closure frame 2 by screws or similar devices 11. This plate carries a keeper, preferably in the form of a sleeve 12 adapted to receive the end of the bolt 6 when the same is projected. That end of the sleeve which is furthest removed from the bolt has a short recess 13 therein for a purpose which will be hereinafter explained.

A flexible device such as the chain 14 has one end anchored to the keeper 12. This anchoring may be accomplished by providing a pair of openings 14' in the keeper and passing the end link or anchoring ring 15 of the chain through said openings. The chain at its free end carries a locking device or key such as 16.

It will be noted that the bolt sleeve 5 at one end is of increased height providing an offset portion 17 having a longitudinal slot 18 therein. The key 16 is formed with a relatively narrow intermediate portion 19 adapted to be accommodated between the adjacent edges of the offset portion 17 of the sleeve 5.

In order to prevent an intruder from opening the bolt from the outside, one of the recesses 9 communicates with an offset notch or recess 20 extending longitudinally of the sleeve 5. The bolt handle 7 may be slipped into this recess, as seen most clearly in Figure 3 and when the same is in this position it is impossible to turn the bolt. In order to turn the bolt, the handle member must be moved into the adjacent recess 9 and then turned. The recesses 9, as hereinbefore mentioned, prevent longitudinal movement of the bolt.

The bolt or the chain lock may be used together, as seen most clearly in Figure 1, or may be used entirely independently of one another, the bolt sleeve 5 being so constructed that the key 16 may be conveniently slipped into the slot 18 of the offset portion 17 without interfering with the bolt handle regardless of whether the bolt is in projected or retracted position. When the chain lock is not in use, the key 16 is received by the slot 13 in the keeper so that the chain can be conveniently held out of the way when not in use.

Although I have illustrated one of the preferred embodiments of my invention, it will be apparent that various slight changes and alterations might be made in the general form and arrangement of the parts described without departing from the invention, and hence I do not wish to limit myself to the precise details set forth, but shall consider myself at liberty to make such slight changes and alterations as fairly fall within the spirit and scope of the appended claims.

I claim:

1. A combined bolt and chain lock, including a bolt sleeve, a bolt slidable therein, a keeper adapted to receive said bolt, a flexible device anchored to the keeper, a key at the free end of the flexible device, said bolt sleeve including an offset portion adapted to receive said key.

2. A combined bolt and chain lock, including a bolt sleeve, a bolt slidable therein, a keeper adapted to receive said bolt, a flexible device anchored to the keeper, and a key at the free end of the flexible device, said bolt sleeve including a raised slotted portion, said key including a reduced intermediate portion adapted to slide in said slot.

3. A combined bolt and chain lock, including a bolt sleeve, a bolt slidable therein, a keeper adapted to receive said bolt, a flexible device anchored to the keeper, and a key at the free end of the flexible device, said bolt sleeve including a raised slotted portion, said key including a reduced intermediate portion adapted to slide in said slot, said keeper having a longitudinal slot therein adapted to receive said key when the flexible device is detached from the bolt sleeve.

MEYER J. GOLDSTEIN.